United States Patent [19]

Kelley

[11] Patent Number: 5,039,423

[45] Date of Patent: Aug. 13, 1991

[54] PROCESS FOR PURIFICATION OF WATER

[75] Inventor: Joseph M. Kelley, Westfield, N.J.

[73] Assignee: International Dioxcide, Inc., Clark, N.J.

[21] Appl. No.: 525,960

[22] Filed: May 11, 1990

[51] Int. Cl.$^5$ ............................................. C02F 9/00
[52] U.S. Cl. ................................... 210/664; 210/668; 210/669; 210/683
[58] Field of Search ............... 210/664, 668, 669, 683, 210/754, 756, 764

[56] References Cited

U.S. PATENT DOCUMENTS 3,733,266 5/1973 Bishop et al. ...................... 210/668
3,779,909 12/1973 Wisfeld et al. ..................... 210/668

Primary Examiner—Ivars Cintins
Attorney, Agent, or Firm—Burns, Doane, Swecker & Mathis

[57] ABSTRACT

Provided is a process for the disinfection of raw water with chlorine dioxide and the removal of virtually all disinfection by-products. The process comprises contacting the water to be purified with a sufficient amount of gaseous chlorine dioxide to kill any microorganisms and thereby disinfect the water. The water is then stripped with air to remove $ClO_2$ and any organic chemicals, with the resulting water then being contacted with a strong anion exchange resin to remove any by-products such as chlorite and chlorate ions formed in the disinfection process. The integrated process efficiently and effectively provides a water product which can contain essentially no chlorine dioxide, chlorite ions, chlorate ions or trihalomethanes, and which also is fully disinfected.

15 Claims, No Drawings

PROCESS FOR PURIFICATION OF WATER

BACKGROUND OF THE INVENTION

The present invention relates to the purification and disinfection of raw water with chlorine dioxide and the subsequent removal of disinfection by-products. More particularly, the present invention relates to a process for the production of potable water by treating water infected with microbial life with gaseous chlorine dioxide, stripping the treated water, and then removing disinfection by-products by ion exchange.

For many years, chlorination was carried out for the disinfection of raw water. However, it was discovered some time ago that when surface water is chlorinated, trihalomethanes (THM's) are produced. It has been determined that various trihalomethanes, such as chloroform, are carcinogenic. It has further been determined that chlorinated drinking water, when ingested by laboratory animals, has also shown signs of carcinogenic effects.

As a result of such determinations, a survey of large municipal water systems was undertaken to determine how serious the trihalomethane problem was for systems using surface water as a feed for the municipal water plant. The resulting study entitled "National Organics Reconnaissance Survey for Halogenated Organics" by James M. Symons et al determined that many of the municipal water systems exceeded the 100 parts per billion (ppb) maximum trihalomethane level set by the EPA. Facilities testing in excess of the 100 ppb maximum THM level were required to switch to alternate disinfection systems such as chlorine dioxide disinfection, or in a some cases ozone disinfection.

Unfortunately, switching from a chlorination system to an ozone or chlorine dioxide disinfection system does not solve all the problems.

For example, in the switch from chlorination to chlorine dioxide disinfection it is possible to decrease the THM content in the disinfected water. However, in the disinfection process chlorine dioxide is reduced to chlorite ion by oxidation of the microorganisms or organic chemicals in the surface water. There may also be unreacted chlorite ions from the chlorine dioxide generation which normally converts only about 90% of the sodium chlorite to chlorine dioxide.

The presence of chlorite ion in human drinking water is of substantial concern because of a fear of adverse health effects on dialysis patients and glucose-6-phosphate dehydrogenase deficient individuals. Because of these health considerations, the EPA has advised that the total concentration of $ClO_2$, $ClO_2^-$ and $ClO_3^-$ not exceed 1.0 ppm in finished drinking water.

Ozone disinfection is also beset with various deficiencies. Namely, the ozone is very expensive to generate, unstable and possibly carcinogenic. Because ozone is unstable and exhibits a loss of concentration very rapidly in water, it is necessary to add a stable disinfectant before distribution through the water system to prevent bacterial formation in the distribution piping.

Another method of decreasing the THM content in treated water is the addition of chloramines. Chloramines are formed by reacting chlorine with ammonia in water and are capable of reducing the formation of THM's, but they are not particularly potent as a disinfectant and are particularly detrimental to certain individuals with specific kidney problems.

The systems discussed above are the major processes for the disinfection of water approved by the Office of Drinking Water within the EPA. Chlorine dioxide disinfection is the typical disinfection method of choice when trihalomethanes in a chlorinated water system exceed the maximum contaminant level set by the EPA. Furthermore, it is expected that the EPA will lower the maximum acceptable THM level from 100 ppb to 35-50 ppb in the future. This will add pressure to municipalities to move away from $Cl_2$ in their disinfection step.

Most existing chlorine dioxide processes do not, however, focus on the possible adverse effects that the presence of disinfectant by-products, e.g., chlorite or chlorate ions, in the drinking water has on human health. Furthermore, presently available processes for the generation of chlorine dioxide permit the reaction product, sodium chloride, to be added to the municipal water system along with unreacted chlorite ion, and HOCl if excess chlorine is added in the generator. Sodium chloride is undesirable in the case of people suffering from hypertension. Chlorite ion, either from unreacted sodium chlorite in the generator or from $ClO_2$ which has been reduced in reaction with biological materials or organic compounds, is undesirable due to possible health effects in individuals susceptible to low levels of chlorite ions. Hypochlorous acid is undesirable because it chlorinates any organic compounds and because of the reports linking it to carcinogenicity in laboratory animals.

Accordingly, it is an object of the present invention to provide a novel process for the disinfection of water that prevents formation of the objectionable trihalomethanes.

Yet another object of the present invention is to provide a process for the disinfection of water which removes all or virtually all of the objectionable by-products of the disinfection process.

Still another object of the present invention is to provide a novel process which yields a water product which is essentially free of trihalomethanes as well as substantially all the objectionable disinfection by-products resulting from the disinfection process.

Another object is to provide a novel process for efficiently preparing chlorine dioxide for use in such water treatments.

These and other objects, as well as the scope, nature and utilization of the invention, will become apparent to those skilled in the art from the following description, drawing, and appended claims.

SUMMARY OF THE INVENTION

In accordance with the foregoing objects there is provided a process for the disinfection of raw water which comprises:

(a) treating raw water with a gaseous chlorine dioxide in quantities sufficient to kill microbial life, and thereby disinfect the water;

(b) stripping the water treated in (a) to remove excess chlorine dioxide and volatile organic compounds, and (c) passing the stripped water from (b) through an anion exchange resin.

The foregoing integrated process effectively and efficiently provides one with a purified water product that is essentially free of objectionable trihalomethanes and the undesirable by-products associated with the treatment of water with a chlorine dioxide disinfectant.

The present invention also provides a novel process for preparing chlorine dioxide, which process comprises reacting an alkaline chlorite, e.g., sodium chlorite, and chlorine, wherein the concentration of chlorite is maintained at about 1.5 g/l or greater. The process efficiently produces chlorine dioxide in high yields, which chlorine dioxide can then be used in the treatment of raw water.

DETAILED DESCRIPTION OF THE PREFERRED EMBODIMENTS

Purification of raw water with chlorine dioxide requires the use of a substantial amount of chlorine dioxide. Because of its nontransportability due to the highly explosive nature of chlorine dioxide when in high concentrations, chlorine dioxide is generally produced on site.

The chlorine dioxide used to treat raw water can be produced by any of the chlorine dioxide generation techniques known to the art. It is preferred, however, that the chlorine dioxide generation be accomplished by reacting an alkaline chlorite and chlorine, preferably by adding in separate streams, without premixing, a 25% sodium chlorite solution and chlorine gas directly into a water stream. One way to accomplish this is by an educator system which produces a vacuum. The water stream containing the sodium chlorite and chlorine gas is then mixed to ensure complete reaction of the components. Effective mixing can be accomplished by running the water stream through a static mixer.

It is desirable to achieve a very high yield in the production of chlorine dioxide because as the chlorine dioxide yield increases the amount of by-products decreases. In order to achieve a high yield of chlorine dioxide, i.e., in excess of 90%, it is important to maintain a concentration of at least about 1.5 g/l, and preferably above about 2.0 g/l, of chlorite in the water after dilution, as the $ClO_2$ yield falls off rapidly when the concentration of sodium chlorite in the reaction solution falls below about 1.5 g/l. Maintaining the concentration of sodium chlorite in the reaction solution above about 1.5 g/l is also significant in avoiding specific problems with the formation of trihalomethanes. For if the chlorite concentration is less than about 1.5 g/l, large excesses of $Cl_2$ must be used to obtain high conversions, which is undesirable due to the resulting high propensity for trihalomethane formation. It is also preferred to maintain a concentration of $Cl_2$ slightly above the stoichiometric ratio of approximately 0.4 lbs. of chlorine per pound of sodium chlorite added.

The preferred $Cl_2$/ sodium chlorite ratio is achieved by maintaining the effluent from the generator at a pH of about 2.7 to 3.2. The pH of the effluent from the generator is controlled by adjusting the amount of $Cl_2$ entering the system which is in turn controlled by adjusting the $Cl_2$ rotameter on the generator. The concentration of sodium chlorite in the water mixture can be controlled by changing nozzles in the educator system in order to increase or decrease the water flow rate. Using the above principles, it is possible for one to operate a generator at or above a 90% chlorine dioxide yield over the whole range of rotameter settings. It is further possible to achieve chlorine dioxide yields in excess of 95% if the preferred ratios of the generation process are employed.

For example, in a standard 200 lbs. per day generator built by International Dioxide, Inc. at high settings of the chlorite rotameter, e.g., at settings greater than 30, a #14 chlorinator nozzle (Capital Controls, Inc. 200 ppd), which delivers water at a rate of about 10 gal/min., can be used to create the vacuum to draw the reactant into the water stream. At the lower range (10–30 setting) on the rotameter the yield of chlorine dioxide tends to fall below 90%. The yield can be increased to over 90% by substituting a #13 nozzle in the educator for the standard #14 nozzle when the generator is operated at low feed rates. The reactant solution in the generator must be maintained, however, above 1.5 grams/liter of sodium chlorite and preferably above 2.0 g/liter in order to maintain the yield of $ClO_2$ above 90%. The solution from the generator contains between 100 and 3000 ppm free $ClO_2$ depending on the rotameter setting and nozzle size used. This principle is illustrated subsequently in Examples 1 to 9, as carried out in an International Dioxcide Oxychlor Basic $ClO_2$ generator.

It is desirable to separate the chlorine dioxide from the chlorine dioxide generation solution and the by-products of the chlorine dioxide generation process. This is done in an attempt to further purify the final water product so as to minimize the adverse health effects caused by the objectionable by-products. The present invention contemplates stripping the free $ClO_2$ by any known method that will insure the desired levels of $ClO_2$ removal. The stripping process is conducted using an inert gas or air. More preferably, the stripping of the $ClO_2$ from the liquid is conducted using air in a countercurrent flow within a packed column. For example, a solution containing 100–3000 ppm $ClO_2$ gas dissolved in water is added to the top of a stripping tower packed with a ceramic packing such as ¼ inch raschig rings. The liquid flowing down the 12 foot column is contacted with air rising countercurrently up the column. As the air contacts the water it strips out the $ClO_2$ gas from the water solution thus producing an overhead gas stream which contains $ClO_2$ in air. For safety reasons it is desirable to maintain the $ClO_2$ in air concentrations below the explosive limit of about 10% $ClO_2$ in air. The resulting gaseous stream containing $ClO_2$ can then be used in purifying water.

The use of $ClO_2$ gas in water disinfection has several advantages over the addition of a $ClO_2$ liquid stream from a standard $ClO_2$ generator. The effluent from a standard $ClO_2$ generator contains several disinfection by-products which may be objectionable. For example if a three component acid generator or a chlorine-chlorite generator is used to produce $ClO_2$ in water, sodium sulfate or sodium chloride and hypochlorous acid are included with the solution of $ClO_2$ in water which is added to the raw water to be disinfected. Inclusion of a salt is objectionable for persons having hypertension. Likewise, hypochlorous acid will cause the chlorination of organic compounds present in the water, leading to the formation of trihalomethanes which are carcinogenic. In addition, ingestion of hypochlorous acid has been shown to induce carcinogenic effects in certain laboratory animals. By stripping the gaseous $ClO_2$, which is soluble in the effluent from the generator, all of the non-volatile ionic impurities are left behind in the solution and only pure $ClO_2$ gas is removed by the air.

The gaseous stream containing the $ClO_2$ is then added to the water to be disinfected at a rate that results in a concentration of preferably about 1.0–1.5 ppm free $ClO_2$ in water. The $ClO_2$ is allowed to contact the water for a period of time sufficient to kill any microorganisms which might be present. The period of time necessary will vary in accordance with the $ClO_2$ concentration. See, for example, *Chlorine Dioxide: Chemistry and Envi-* ronmental Impact of Oxychlorine Compounds, Ann Arbor Science Publishers, 1979.

During the disinfection process, the chlorine dioxide attacks the microorganisms present in the water by oxidation of protein in the cell, thereby interrupting synthesis in the life cycle and killing the microorganisms. The chlorine dioxide also tends to oxidize organic compounds present in the raw water, thus removing these objectionable substances. In the course of these oxidative reactions, however, the $ClO_2$ is reduced to chlorite ion. In addition, some chlorate ion is formed by disproportionation of the $ClO_2$ into chlorite and chlorate.

In order to eliminate the volatile impurities from the disinfected water, the water is subjected to a stripping operation wherein the excess chlorine dioxide is removed by stripping with a gas, e.g., an inert gas or air. The stripping gas of choice is air due to its availability, cost, and effectiveness. By stripping the disinfected water according to the above method, it is possible to achieve a water product that is essentially free of all disinfectants and all volatile disinfectant by-products. The gas stripping operation also tends to remove a majority of the contaminating organic compounds present in the raw water. The only impurities which remain in the purified, disinfected water after the gas stripping process are the chlorite and chlorate ion disinfection by-products. It should be noted, however, that some small amount of chlorine dioxide can be left in the stripped water, particularly if the water is to be used for a municipality. A complete removal of chlorine dioxide by the stripping step of the present invention is not necessary in such an instance.

In the process of the present invention, the chlorite and chlorate ion disinfection by-products are removed by ion exchange with an anion exchange resin. The ion exchange resin is able to bind the chlorite and chlorate ions, thereby allowing their removal from the disinfected water. It is important that the ion exchange resin be strong enough to bind and remove virtually all of the chlorite and chlorate ions. It is preferable, therefore, to use a strongly basic anion exchange resin. It is even more preferable to use a strongly basic anion exchange resin containing quaternary amine functional groups such as Amberlite IRA-904. Treatment of the disinfected water with an anion exchange resin results in a disinfected water containing little or no organic compounds, THM's, HOCl, chlorine dioxide, chlorite or chlorate ions, or any other objectionable disinfection by-products. The EPA recommends that the concentrations of chlorate ion, chlorite ion and chlorine dioxide in disinfected water not exceed 1.0 ppm total. The process of the present invention permits one to treat water samples containing high levels of $ClO_2$ exceeding EPA limits, and provide a water product containing levels of $ClOP_2$, chlorate and chlorite below those recommended by the EPA.

The process according to the present invention may be used strictly as described above, or the process can incorporate other water purification schemes such as filtration, flocculation, lime addition or the like without diminishing the effectiveness of the scheme outlined above.

The following examples are given to demonstrate the disinfection and purification of raw water according to the present the invention. It is understood that these examples are given by way of illustration and are not meant to limit the disclosure or the claims to follow.

EXAMPLES 1-9

An Oxychlor Basic $ClO_2$ generator, manufactured by International Dioxide, Clark, N.J., was used to generate chlorine dioxide. Using various rotameter settings, the concentration of chlorite in the reaction solution was controlled. The sodium chlorite was reacted with chlorine to produce chlorine dioxide. Nine different runs were made.

Yields of $ClO_2$ of 90% or greater were obtained whenever the chlorite concentration in the reaction mixture was maintained at 1.5 g/l or greater.

The concentration of reactants and yields of $ClO_2$ for each of the nine runs are set forth in the following table.

TABLE

| Ex. No. | Rotameter Setting | Rate of Chlorite Feed (lbs/hr) | Chlorite Conc. g/l | $Cl_2$ (lbs/hr) | pH | Yield of $ClO_2$ % |
|---|---|---|---|---|---|---|
| 1 | 85 | 15.5 | 3.4 | 10 | 2.7 | 97 |
| 2 | 80 | 14.3 | 3.2 | 8.7 | 2.7 | 99 |
| 3 | 70 | 12.1 | 2.7 | 7.5 | 2.8 | 90 |
| 4 | 60 | 10.1 | 2.2 | 6.5 | 2.7 | 94 |
| 5 | 50 | 7.9 | 1.8 | 5.2 | 2.9 | 93 |
| 6 | 40 | 6.1 | 1.4 | 4.2 | 2.8 | 87 |
| 7 | 30 | 4.2 | 0.93 | 2.6 | 2.8 | 79 |
| 8 | 20 | 2.5 | 0.56 | 1.7 | 2.8 | 75 |
| 9 | 10 | 0.85 | 0.19 | 0.75 | 3.1 | 67 |

EXAMPLE 10

A 150 ppm solution of chlorine dioxide gas in water was prepared by carefully adding 15 c.c. of hydroxy acetic acid in four portions to 60 c.c. of 25 wt. % sodium chlorite in a beaker and absorbing the liberated gas in distilled water until about 3100 ppm of $ClO_2$ dissolved in water was obtained. This solution was analyzed in a spectrophotometer at 390 nm and diluted to a concentration of 150 ppm $ClO_2$ in water. This solution was then added to Pembroke Park, Fla. city water (which by analysis contained 6.6 ppm $Cl_2$) to give a level of approximately 10 ppm $ClO_2$. After addition of the $ClO_2$ solution the Pembroke Park water was analyzed with the following results:

Color: pale yellow
odor: slight sharp
pH: 7.3
Total $ClO_2$—11 ppm by KI—thiosulfate analysis
Free $ClO_2$—13 ppm free $ClO_2$—Spectrophotometer at 390

This sample was then aged for 4 days and reanalyzed by amperometric titration. The results are shown below:
Color: water white
Odor: none
pH: 6.81

Free $ClO_2$:
 5.7 ppm Total
 3.0 ppm Free
 0 ppm (Titrimeter)

Chlorite ion ($ClO_2$)=12.4 ppm (Titrimeter)
Chlorine: 2.1 ppm (Titrimeter).

This sample was then air stripped overnight at a rate of 722 ml air/min and reassayed as follows:
Color: water white
Odor: none pH: 7.5–7.6
$ClO_2$: 10.1 ppm amperometric titrimeter $ClO_2^-$: 10.1
ppm $ClO_2$: 1.4.

The above sample was then passed through a 1"×24" ion exchange column packed with Rohm & Haas Type IRA 904 strong anion exchange resin at 3 v/v/hr feed rate which was 16 ml/min. This sample was then assayed by amperometric titration with the following results:
Color: water white
Odor: None
pH: 6.5
$ClO_2^-$: 0 ppm
$ClO_2$: 0 ppm Since the content of the disinfection by-products was below the detectable limits for the amperometric titration method, samples were sent to two independent laboratories for chlorite and chlorate analysis by ion chromatography. These results are recorded below:

|  | Laboratory I | Laboratory II |
|---|---|---|
| Chlorite ion, ppb | none detected (<30) | none detected (<50) |
| Chlorate ion, ppb | 20 | none detected (<40) |

EXAMPLE 11

Example 10 was repeated with distilled water as a control. The results of the analysis after treatment with 10 ppm $ClO_2$, stripping, and ion exchange as described in Example 10 are less than 40 ppb chlorate, and less than 30 ppb chlorate ion.

EXAMPLE 12

Two samples of Pembroke Park, Fla. city water were treated with massive doses of chlorine dioxide, 500 ppm and 1000 ppm respectively. Aging, air stripping and ion exchange were carried out as described in Example 10. The purified water was then analyzed by amperometric titration with the following results
$ClO_2 = 0$,
$ClO_2^- = 0$ and
$ClO_2 = 0$ and
$ClO_3^-$ 0.55 ppm and 0.78 ppm,
respectively. Since the levels of chlorite and chlorate were well below the limits of amperometric titration, the samples were analyzed by ion chromatography.

|  | 500 ppm $ClO_2$ treatment | | 1000 ppm $ClO_2$ treatment | |
|---|---|---|---|---|
|  | Lab 1 | Lab 2 | Lab 1 | Lab 2 |
| Chlorite | <30 ppb* | 1.17 ppm | <30 ppb | 0.78 ppm |
| Chlorate | <40 ppb | — | <40 ppb | —. |

*Note: A small poorly defined peak that might be equivalent to 60 ppb chlorite was observed a confirmatory spike of known chlorite standard proved inconclusive. In view of the doubling in concentration of a massive $ClO_2^-$ dose without effect on the peak it is doubted that the peak represents chlorite.

It is believed that the analysis of lab 2 is in error since they do not agree with lab 1 or the amperometric method, which method is quite sensitive in the ppm range and is capable of detecting 0.1 ppm levels easily.

EXAMPLE 13

A 2 liter sample of Pembroke Park, Fla. city water was treated with 188.6 ml of a chlorine dioxide solution containing 5,302 ppm free chlorine dioxide produced in a gaseous laboratory generator. The water containing approximately 500 ppm $ClO_2$ was allowed to react for 24 hours at ambient conditions and then was air stripped to remove excess unreacted $ClO_2$ and organic contaminants. The water was then analyzed and passed through a IRA 904 ion exchange column under the conditions described in Example 10, and then reanalyzed.

The results of the analyses are shown below:

|  | Before Ion Exchange | After Ion Exchange |
|---|---|---|
| Chlorite ion, ppm | 12.4 | 0 |
| Chlorate ion, ppm | 0 | 0 |
| Chlorine Dioxide, ppm | 0.137 | 0 |
| $Cl_2$, ppm | 2.3 | 0.130 |

Since the values of disinfectant by-products was below the limit of the amperometric titration detection, the sample was analyzed by ion chromatography. The result of this analysis was as follows:
chlorate—<40 ppb
chlorite—<30 ppb While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A process for the purification of water comprising:
    (a) treating raw water with gaseous chlorine dioxide in quantities sufficient to kill microbial life, and thereby disinfect the water;
    (b) stripping the treated water with an inert gas or air in order to remove chlorine dioxide and volatile organic compounds, and
    (c) passing the water from (b) through an anion exchange resin.

2. The process of claim 1 wherein the amount of chlorine dioxide used in step (a) ranges from about 0.5 to about 10.0 ppm in water.

3. The process of claim 1 wherein the amount of chlorine dioxide used in step (a) ranges from about 1.0 to about 1.5 ppm in water.

4. The process of claim 1, wherein the chlorine dioxide used in (a) is generated by introducing sodium chlorite and chlorine gas into a water stream.

5. The process of claim 4, wherein the sodium chlorite and chlorine gas reacted to form the chlorine dioxide are introduced by separate feed lines into a water stream without substantial prior mixing, followed by completed mixing in the water stream.

6. The process of claim 4, wherein the concentration of the sodium chlorite in the water stream is at least about 1.5 grams per liter.

7. The process of claim 4, wherein the concentration of the sodium chlorite in the water stream is at least about 2.0 grams per liter.

8. The process of claim 4, wherein the concentration of chlorine gas is above the stoichiometric ratio of chlorine gas to pure sodium chlorite on a per pound basis.

9. The process of claim 4, wherein the concentration of the sodium chlorite in the water stream is at least about 2.0 grams per liter, and the amount of the chlorine dioxide used in treating raw water ranges from about 0.5 to about 10.0 ppm in water.

10. The process of claim 1, wherein the gaseous chlorine dioxide used in (a) is prepared by stripping effluent from a chlorine dioxide generator with an inert gas or air.

11. The process of claim 1, wherein the treated water is stripped by passing the water to the top of a packed stripping tower and allowing said water to proceed down the packed column by gravity while a stream of air is added to the base of the column in order to strip out the dissolved chlorine dioxide as a gas, while leaving nonvolatile products in solution.

12. The process of claim 1, wherein the anion exchange resin is a strongly basic anion exchange resin.

13. The process of claim 12, wherein the strongly basic anion exchange resin contains quaternary amine functional groups.

14. The process of claim 1, wherein the stripping gas of step (b) is air.

15. The process of claim 1, wherein the chlorine dioxide used in (a) is generated by reacting an alkaline chlorite and chlorine, with the chlorite concentration being at least about 1.5 g/l.

* * * * *